Oct. 3, 1967 S. J. MATYCKAS 3,345,570
TRANSISTOR PROTECTION CIRCUIT FOR RADIO TRANSMITTER
Filed May 26, 1965
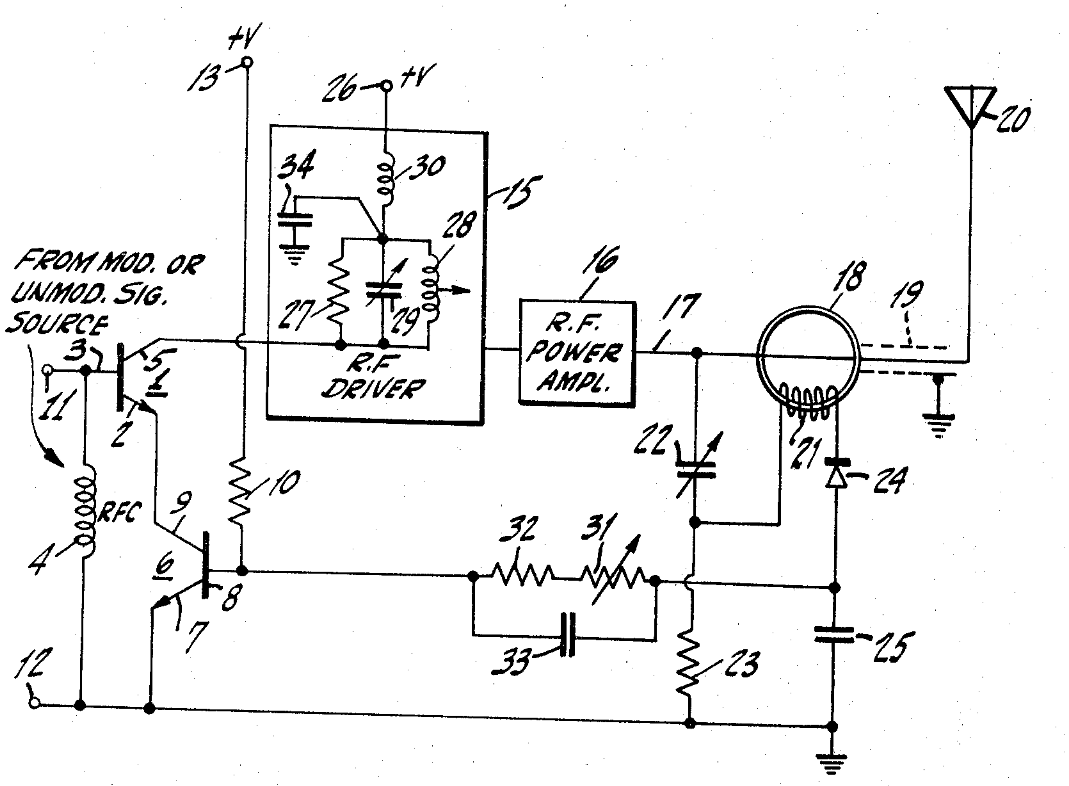
INVENTOR.
STANLEY J. MATYCKAS
BY
Edward J Norton
Attorney 3,345,570
Patented Oct. 3, 1967

3,345,570

TRANSISTOR PROTECTION CIRCUIT FOR RADIO TRANSMITTER

Stanley J. Matyckas, Plainfield, N.J., assignor to Radio Corporation of America, a corporation of Delaware Filed May 26, 1965, Ser. No. 458,989
6 Claims. (Cl. 325—150)

ABSTRACT OF THE DISCLOSURE

The output of a transmitter is sensed by a bridge network to determine the amount of load mismatch. A D.C. voltage proportional to the magnitude of the mismatch and produced by the bridge is used to control by degeneration the gain of transistor amplifier stages in the transmitter, thereby, varying the drive and, in turn, the current in the stages according to the load mismatch.

This invention relates to radio transmitters and more particularly to a circuit for protecting transistors used in radio transmitters from damage resulting from load mismatch conditions.

The small size, high operating efficiency, and reliability of transistors has resulted in a current trend to replace vacuum tubes with transistors. The size and efficiency characteristics of transistors make them especially desirable in mobile radio equipment, where space and available power from a vehicle electrical system is at a premium. A main selling point of transistors used in radio transmitters is reliability. The transistors, however, are subject to permanent damage due to excessive temperatures, voltages, and currents. The excessive temperatures, voltages and currents can be realized when the output of the transmitter is not terminated with a proper load. A particular problem is persented in mobile transmitters where the probability of load mismatch is high due to physical obstructions to antennas, antenna damage, or errors by service personnel. Since the transistors are costly to replace, it is desirable to provide a transistor protection circuit which operates in the event load mismatch occurs and that adds little to the cost and complexity of the transmitter. It is also desirable to provide a protection circuit that does not put the transmitter off the air during a slight mismatch, such as a vehicle passing under a bridge. Further, it is desirable that the transmitter go automatically back on the air after severe load mismatch has cleared.

In the prior art, circuits which detect a condition of antenna mismatch are known. Also, control circuits which respond to such an antenna mismatch to provide overload protection to tubes are known. The known types of control circuits, however, are not satisfactory for use with transistors since their response time is too long. Although the time duration between the application of excessive power to the transistor and the uniform excessive temperature rise inside the transistor is in the order of several milliseconds (which is related to the thermal time constant of the device), the time duration between the application of excessive energy to the transistor and the localized excessive temperature rise at portions of the transistor which will destroy the transistor is in the order of only a few microseconds.

It is therefore an object of the present invention to provide an improved protective circuit that is sufficiently fast enough to protect RF transmitter transistors not only from excessive uniform temperature rise that leads to transistor destruction in the order of several milliseconds, but also from localized high temperature rise that leads to destruction in the order of a few microseconds, because of the excessive energy application to the transistor devices caused by load mismatch.

A further object is to provide, under conditions where the load mismatch is not too severe, an improved system for limiting the dissipation in RF transistors used in transmitters to safe values while keeping the transmitter on the air with reduced power.

A further object is to provide an improved protective circuit for transistors used in transmitters that does not require resetting after a load mismatch has cleared.

Briefly, the objects of the invention are accomplished according to one embodiment by sensing the load mismatch at the output of a transmitter with a voltage-standing-wave ratio bridge. A D.C. voltage produced by the bridge, which is proportional to the magnitude of the mismatch, is used to control the gain in one of the RF stages of the transmitter and, thereby, tó reduce the drive and, in turn, the current in the RF transistor(s) in proportion to the amount of mismatch of the load.

The invention will now be described in greater detail in connection with the single figure of the accompanying drawing which is a circuit diagram of one embodiment of a protecting circuit according to the invention.

The purpose of this invention is to provide a protective circuit for the RF output transistors used in radio transmitters. The RF transistor(s) typically receive unmodulated or modulated carrier signals from the preceding amplification and other stages of the radio transmitter and amplify these signals prior to being applied to the antenna load through a transmission line.

An RF amplifier stage in the transmitter, preferably one several stages from the last stage, utilizes as shown in the drawing an RF transistor device 1. Transistor 1, shown by way of example as an NPN transistor, is connected as a conventional class C common emitter amplifier and serves to amplify RF signals applied between its base 3 and its emitter 2 via a pair of input terminals 11, 12 and a second transistor 6. The input signals can be in the form of a modulated carrier wave or in the form of an unmodulated (CW) signal. An RF choke coil 4 connected across the terminals 11, 12 places the base of the transistor 1 at D.C. zero or ground potential. In practice, the coil 4 may form a part of the coupling as by a transformer means to the previous stage which is not shown.

The second transistor 6 is also shown, by way of example, as an NPN transistor, having emitter 7, base 8, and collector 9. The emitter 7 of the transistor 6 is connected to the input terminal 12 and is at reference potential such as, for example, ground. The collector 9 of transistor 6 is connected directly to the emitter 2 of the first transistor 1. Transistor 6 is normally biased into saturation by forward bias supplied from the positive terminal 13 of a suitable source of unidirectional potential, not shown, through a resistor 10. Since transistor 6 is saturated, its collector 9, and in turn, the emitter 2 of the transistor 1 are at or very close to the D.C. and RF voltage reference point such as, for example, ground potential. The collector 5 of transistor 1 is connected to the positive terminal 26 of a suitable source of unidirectional potential, not shown, over a path including an RF choke 30 and a parallel tuned circuit comprising a resistor 27, an inductor 28, and a variable capacitor 29. A fixed capacitor 34 is shown connected between and the junction of the coke 30 and the parallel tuned circuit. The circuit network including the parallel tuned circuit just described, choke 30, and capacitor 34 are shown included in the block representing the next RF stage 15 to indicate that these elements form a part of the input to next stage 15 as well as forming a part of the transistor stage 1. Transistor 1 thus operates to amplify the RF signal energy applied thereto via the terminals 11, 12. Amplified RF output signals at the collector 5 of the transistor 1 are applied through the RF driver circuit 15 to an output power amplifier 16. The amplified RF output signal from power amplifier 16 is applied over lead 17 and then a transmission line 19 to an antenna 20. Output lead 17 passes through a ferrite toroidal core 18 and in doing so acts as the primary winding of a transformer. A coil 21 wound on the core 18 acts as the secondary winding. A variable capacitor 22 and a resistor 23 are connected in series between output lead 17 and the voltage reference point such as, for example, ground potential. One side of the capacitor 22 is connected to output lead 17. The other side of the capacitor 22 is connected to the resistor 23 and to one end of the winding 21. The voltage across the capacitor 22 and developed across the resistor 23 is in phase quadrature with the voltage at the primary 17 of the transformer including core 18. The voltage induced in the secondary winding 21 of the transformer is in phase quadrature with the current through the primary 17 of the transformer.

The voltage induced in the secondary winding 21 and the voltage across resistor 23 are by the construction described effectively in series with one another. The winding of the secondary 21 is in such direction that when there is no load mismatch to the transmission line 19, the voltage in the secondary 21 is 180° out of phase with the voltage across resistor 23. The resultant net voltage is zero. Since the net voltage is zero, no current is applied through a diode 24 and no voltage is developed across the diode 24. The diode 24 can be poled for current flow in the direction indicated by the arrow with its cathode connected to winding 21 and its anode connected to one side of a capacitor 25.

Should any type of mismatch occur between transmission line 19 and antenna 20 due, for example, to the antenna 20 being broken off, the phase difference will no longer be 180°, and the geometric sum of the two voltages will no longer be zero. The magnitude of the net voltage will depend upon the magnitude of the phase shift and this, in turn, will depend upon the magnitude of the mismatch. The net voltage charges capacitor 25 through diode 24, the other side of the capacitor 25 being connected to ground. The negative voltage developed across capacitor 25 is applied from the junction of capacitor 25 and diode 24 to the base 8 of transistor 6 over a path including a variable resistor 31 and a fixed resistor 32. The resulting change in base bias voltage brings transistor 6 out of saturation into the linear conduction region. The setting of resistor 31 will control the amount of current through transistor 6. Resistor 32 limits the current diode 24 to a safe value in case resistor 31 is accidentally set to zero resistance.

Capacitor 33 across resistors 31 and 32 functions to speed up the response time of the protective system. Once transistor 6 is no longer saturated due to decrease in forward bias voltage applied to the base 8 of the transistor, the voltage at the collector 9 rises in a positive direction. The emitter 2 of transistor 1 thereby becomes more positive with respect to base 3, placing transistor 1 further into class C region and also causing degeneration to take place since the input signal is no longer applied directly between the base 3 of transistor 1 and the emitter 2 through saturated transistor 6. Transistor 6 becomes, in effect, a resistor in the emitter circuit of transistor 1. Since the gain is reduced in transistor 1, the RF power fed from collector 5 of transistor 1 to RF driver 15 and RF power amplifier 16 is also reduced. This in turn causes a reduction of current, voltage and power dissipation to safe values in the RF power amplifier transistor(s). By the arrangement of the invention, as soon as the mismatch condition disappears, transistor 6 again saturates. The gain of the transistor stage 1 returns to the normal level. The amount of control directly follows the degree or severity of the mismatch condition. It is also seen that where a severe mismatch condition has not occurred as would require the transmitter to shut down completely, the level of operation for the RF stages will be reduced to a safe value without needlessly disrupting service.

Instead of using NPN junction transistors as shown in the drawing, PNP junction transistors may be used by reversal of the polarity of external D.C. power supply. A net positive, rather than negative voltage, can easily be developed at capacitor 25 by reversing the diode 24. Also, the invention is not limited to use as a protective circuit for mobile radio transmitters, but can also be used as an improved protection circuit for RF stages in any transmitter.

By way of example, a protective circuit was constructed for use in a 50 mc. CW transmitter. The 50 mc. CW transmitter was tuned for 50-watt output power at 28-volt collector supply.

The various components were of the following values:

| | |
|---|---|
| Transistor **1** | 2N3118. |
| Transistor **6** | 2N3053. |
| Diode **24** | 1N3067. |
| Capacitor **22** | 0.9 to 7 pf. trimmer. |
| Capacitor **25** | 1000 pf. |
| Capacitor **33** | 0.01 $\mu$f. |
| Inductor, RFC **4** | 7 $\mu$hy. |
| Resistor **10** | 24,000 ohms. |
| Resistor **23** | 240 ohms. |
| Resistor **31** | 50,000 ohm potentiometer. |
| Resistor **32** | 1000 ohms. |

What is claimed is:

1. In a circuit arrangement having transistor stages followed by a transmission line and a load, a protection circuit for said transistors comprising, means responsive to load mismatch to the transmission line to provide a D.C. output voltage that is proportional to said mismatch, a transistor amplifier located at one of said stages, a second transistor, means coupling said second transistor between said first-mentioned means and said transistor amplifier to provide degeneration of said transistor amplifier in response to said D.C. output voltage so as to limit the dissipation in said transistor amplifier under all conditions of said mismatch to a safe value which avoids damage to said transistor amplifier.

2. In a circuit arrangement having transistor stages followed by a transmission line and a load, a protection circuit for said transistors comprising, a bridge circuit responsive to any type of load mismatch to the transmission line to provide a D.C. output voltage that is proportional to the magnitude of the mismatch, a transistor amplifier located at one of said stages, a second transistor, means coupling said second transistor between said bridge circuit and said transistor amplifier to provide degeneration of said transistor amplifier in response to said D.C. output voltage from said bridge circuit so as to limit the dissipation to a safe value in said transistor amplifier under all load mismatch conditions.

3. In a transmitter having RF transistor output stages followed by a transmission line and an antenna, a protection circuit for said transistors comprising, means responsive to any type of load mismatch to the transmission line to provide a D.C. output voltage that is proportional to the mismatch, a transistor amplifier connected in a common emitter configuration located at one of said output stages, and a second transistor connected between said emitter of said transistor amplifier and a point of reference potential and responsive to said D.C. output voltage to determine the degenerative feedback in said transistor amplifier so as to limit the dissipation in said transistor amplifier under all load mismatch conditions to a value which avoids damage to said amplifier.

4. In a transmitter having transistor stages followed by a transmission line and a load in the form of an energy radiating element, a protection circuit for said transistors comprising, a bridge circuit responsive to any type of load mismatch to the transmission line to provide a D.C. output voltage that is proportional to the magnitude of the mismatch, a transistor amplifier connected in a common emitter configuration located at one of said stages, and a second transistor connected between said emitter of said transistor amplifier and a point of reference potential and responsive to said D.C. output voltage from said bridge circuit to determine the degenerative feedback in said transistor amplifier so as to limit the dissipation in said transistor amplifier under all load mismatch conditions to a safe value for said transistor amplifier before damage to said transistor amplifier can take place.

5. In a radio transmitter for use in a vehicle having a plurality of cascaded RF output transistor stages followed by a transmission line and an antenna for transmission of radio signals, a protection circuit for said RF transistors comprising, a voltage-standing-wave-ratio bridge responsive to load mismatch to the transmission line to provide a D.C. output voltage that is proportional to the magnitude of said mismatch, one of said transistor stages prior to the last of said stages before said transmission line being connected for operation as a class C common emitter amplifier, and a second transistor connected between said emitter of said one transistor and a point of reference potential in a degenerative manner and responsive to said D.C. voltage from said bridge to reduce the driving power to said one transistor stage and thereby limit the dissipation of said transistor stages in the transmitter under load mismatch conditions to a safe value before transistor damage takes place.

6. In a radio transmitter having a plurality of cascaded RF NPN transistor stages followed by a transmission line and an antenna for transmission of radio signals, a protection circuit for said NPN transistors comprising, a voltage-standing-wave-radio bridge responsive to a load mismatch condition to the transmission line to provide a negative D.C. output voltage that is proportional to the magnitude of said mismatch, one of said transistors prior to the last of said stages before said transmission line being connected for operation as a class C common emitter amplifier, and a further NPN transistor connected between said emitter of said one transistor and a point of reference potential in a degenerative manner and responsive to said negative D.C. voltage from said bridge to reduce the driving power to said one transistor and thereby limit the dissipation of said transistor stages in the transmitter under all load mismatch conditions to a safe value before transistor damage takes place.

References Cited

UNITED STATES PATENTS

| | | | |
|---|---|---|---|
| 2,426,579 | 8/1947 | Peckham | 325—151 X |
| 3,182,260 | 5/1965 | Heaton-Armstrong | 325—151 |
| 3,281,697 | 10/1966 | Hansen et al. | 325—151 |

JOHN W. CALDWELL, *Acting Primary Examiner.*